（12）United States Patent
Namait et al.

(10) Patent No.: US 7,865,507 B2
(45) Date of Patent: Jan. 4, 2011

(54) DATA QUALITY ANALYZER

(75) Inventors: Aman Namait, Redwood Shores, CA (US); Allison Waingold, Sunnyvale, CA (US); Xin Jiang, Foster, CA (US); John S. Kowtko, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1415 days.

(21) Appl. No.: 10/663,296

(22) Filed: Sep. 15, 2003

(65) Prior Publication Data

US 2005/0060313 A1 Mar. 17, 2005

(51) Int. Cl.
*G06F 7/00* (2006.01)
*G06F 17/30* (2006.01)

(52) U.S. Cl. ................... 707/732; 707/722; 707/723; 707/728

(58) Field of Classification Search .............. 707/5, 707/722, 723, 728, 732, 733
See application file for complete search history.

(56) References Cited

U.S. PATENT DOCUMENTS

| 5,721,903 | A | * | 2/1998 | Anand et al. ................ 707/5 |
| 5,787,418 | A | * | 7/1998 | Hibbetts et al. ............. 707/4 |
| 6,014,664 | A | * | 1/2000 | Fagin et al. ................. 707/5 |
| 6,327,590 | B1 | * | 12/2001 | Chidlovskii et al. ......... 707/5 |
| 6,820,082 | B1 | * | 11/2004 | Cook et al. ................. 707/9 |
| 7,096,220 | B1 | * | 8/2006 | Seibel et al. ............... 707/10 |
| 2002/0052882 | A1 | * | 5/2002 | Taylor ..................... 707/104.1 |
| 2002/0077998 | A1 | * | 6/2002 | Andrews et al. ............ 707/1 |
| 2006/0085415 | A1 | * | 4/2006 | Jian ......................... 707/5 |

OTHER PUBLICATIONS

Mary Jo Nott, "New Product News", May 21, 2002, DM Review, http://www.dmreview.com/article_sub.cfm?articleID=5213.*
D. Loshin, "Rule-Based Data Quality," *Proceedings of the Eleventh Int'l. Conference and Knowledge Mgmt., Knowledge Integrity Inc.*, Silver Spring, MD, pp. 614-616 (2002).
"GuardianIQ 1.0 Fact Sheet: The Business Rule Approach to DQ," *Knowledge Integrity Inc., Available electronically* at http://www.knowledge-integrity.com/assets/guardianIQ1.oSupportedvs.pdf., pp. 1-2., May 2002.
R.Y. Wang et al., "Toward Quality Data: An Attribute-based Approach," *Elsevier Science B.V.*, Decision Support Systems 13, pp. 349-372 (1995).

* cited by examiner

*Primary Examiner*—John R. Cottingham
*Assistant Examiner*—Mariela D Reyes
(74) *Attorney, Agent, or Firm*—Townsend and Townsend and Crew LLP (57) ABSTRACT

A method of and system for evaluating contacts stored in data source. In one embodiment the method allows a user to define a data format; allows a user to define a plurality of rules intended to operate on and assess a quality of data formatted according to the data format; map data identifying a plurality of contacts from the data source to the data format; and execute the plurality of rules on the mapped data to produce a set of analyzed data that allows evaluation of potential contacts according to an assessed quality of the data.

9 Claims, 5 Drawing Sheets

DATA QUALITY ANALYZER

BACKGROUND OF THE INVENTION

The present invention relates to a method of and system for evaluating and assessing the quality of contacts stored in a data source. Some specific embodiments of the invention are particularly useful for ranking sales leads according to rules defined by a user intending to identify leads that are more likely than other to produce possible sales.

Information drives corporate marketing and sales programs, which in turn drive organizations. Most organizations have built large customer databases to track and drive these activities through consolidation of data from heterogeneous sources. Unfortunately, these customer lists are typically generated from heterogeneous data sources of varying quality. The quality varies for a number of reasons: sources do not always provide the same data attributes; data timeliness is not guaranteed; and those who entered the data may have had no incentive to provide quality data (e.g. an online survey participant). Thus, entries in the data source are often incomplete and/or inaccurate.

Traditionally, the customer lists are generated and filtered using various ad-hoc methods, such as database queries. For example, in some organizations the customer list is provided to sales managers, who often manually filter poor quality leads and prioritize the leads based on personal experience and intuition. Sales organizations have a different perspective on quality of data than marketing organizations. Apart from the direct impact on revenue, poor quality data may also foster mistrust between sales and marketing organizations.

Accordingly, it can be appreciated that improved methods of assessing the quality of, sorting and filtering sales leads, or other contact information for that matter, are desirable.

BRIEF SUMMARY OF THE INVENTION

Embodiments of the invention provide a highly customizable and highly automated method of and system for sorting and/or filtering contact information. Some embodiments of the invention are particularly useful for sorting, filtering and/or ranking sales leads, such as leads generated from multiple heterogeneous sources of data.

One embodiment of the invention provides a method for evaluating contacts stored in data source. This embodiment comprises allowing a user to define a data format; allowing a user to define a plurality of rules intended to operate on and assess a quality of data formatted according to the data format; mapping data identifying a plurality of contacts from the data source to the data format; and executing the plurality of rules on the mapped data to produce a set of analyzed data that allows evaluation of potential contacts according to an assessed quality of the data. In a specific embodiment the data source can be either a database or a spreadsheet file. Also, in a specific embodiment the rules that can be defined by a user include spatial rules, age/lineage rules, pattern-based rules, electronic validation rules and numeric operator-based rules.

Another embodiment of the invention provides a method of evaluating sales leads stored in a data source. This embodiment comprises allowing a user to define a data format; allowing a user to define a plurality of rules that operate on data formatted according to the data format, wherein the rules are intended to assess a quality of data and include spatial rules, pattern-based rules and electronic validation rules; mapping data identifying a plurality of sales leads from the data source to the data format, wherein the data source is either a database or spreadsheet file; and executing the plurality of rules on the mapped data to score the mapped data and produce a set of analyzed data usable to assess the quality of sales leads in the data source.

One embodiment of a system for evaluating contacts stored in data source according to the present invention includes a user interface component and a rules engine component. The user interface component is configured to allow one or more users to define a data format; define a plurality of rules that operate on, and are intended to assess a quality of, data formatted according to the data format; and map data identifying a plurality of contacts from the data source to the data format. The rules engine component is configured to execute the plurality of rules on the mapped data to produce a set of analyzed data that allows evaluation of potential contacts according to an assessed quality of the data. In a specific embodiment the user interface component also allows users to associate a score with each defined rule and wherein the rules engine component scores the mapped data during execution of the plurality of rules. In other specific embodiments the user interface is further configured to, after the rules engine executes the plurality of rules, allow a user to rank data from the set of analyzed data according to its score and/or allow a user to sort data from the set of analyzed data into buckets according to whether or not the data passed specific rules identified by the user.

These and other embodiments of the invention along with many of its advantages and features are described in more detail in conjunction with the text below and attached figures.

BRIEF DESCRIPTION OF THE DRAWINGS

FIG. 4 is an exemplary Web page that is generated by system 10 to facilitate the creation of rules 32 according to one embodiment of the method of the invention;

FIG. 5 is an exemplary Web page that is generated by system 10 to facilitate the creation of filters to generate bucketed data 44 according to one embodiment of the method of the invention.

DETAILED DESCRIPTION OF THE INVENTION

Figure 1:
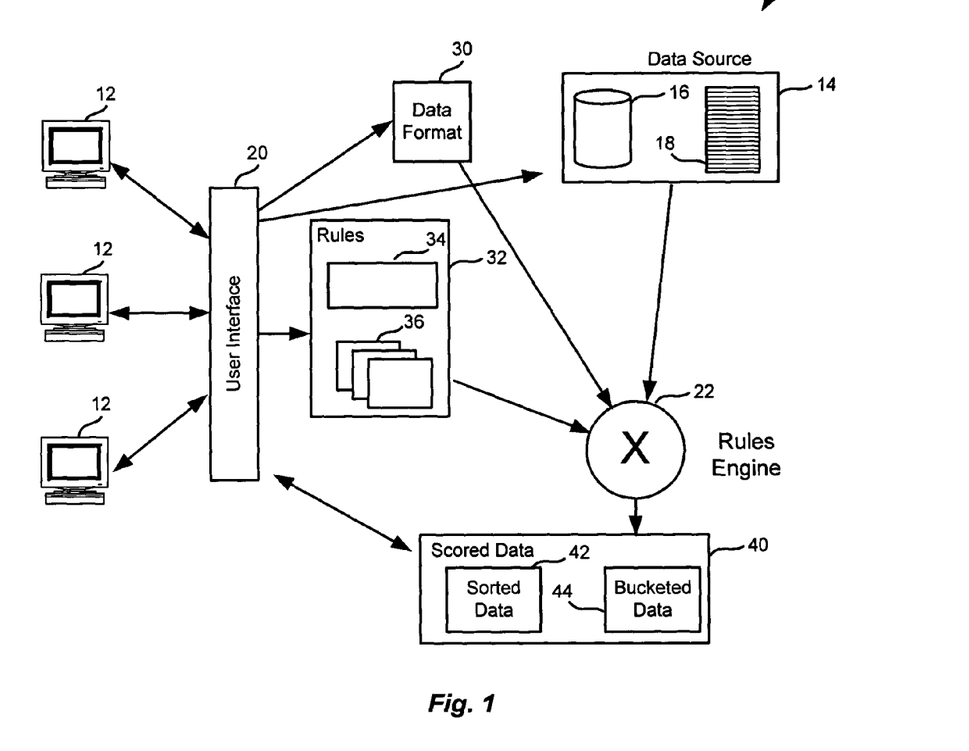
FIG. 1 is a block diagram of a highly customizable and highly automated system for sorting and/or filtering contact information according to one embodiment of the present invention.

FIG. 1 is a block diagram of a highly customizable and highly automated system 10 for sorting and/or filtering contact information according to one embodiment of the present invention. System 10 allows users 12, such as users associated with an organization's marketing and/or sales departments, to sort, filter, rank and/or otherwise analyze contact information stored in a data source 14. Data source 14 can be any appropriate data structure that stores multiple contact records. In one embodiment data source 14 is either a database file 16 or a spreadsheet file 18.

System 10 includes a number of different logical components that are hosted on a computer system, which may include a number of distributed server systems and client systems. The logical components, which for illustrative purposes are shown as user interface 20 and rules engine 22 are executed by users 12 to sort, filter, rank and/or otherwise analyze sales contact information in data source 14. Such information is sometimes referred to herein as sales leads, sales prospects or customer information. It is to be understood, however, that system 10 is not limited to any particular type of contact information in data source 14 and that system 10 can be used to assess the quality of other types of contact information including, for example, vendor contacts and partner contacts among others. It is also to be understood that components 20 and 22 are logically represented in FIG. 1 and that system 10 can include fewer, more or differently arranged logical components.

Figure 2:
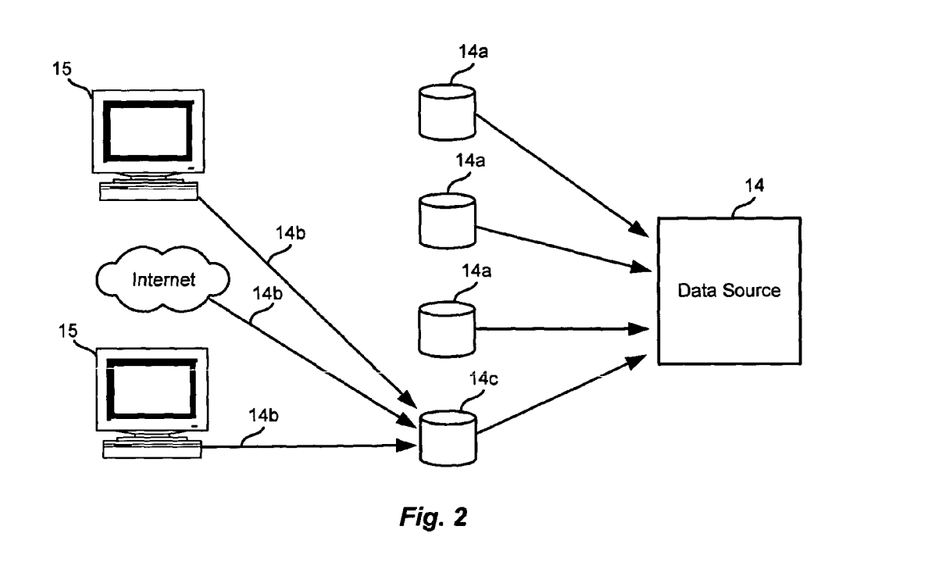
FIG. 2 is a simplified block diagram showing one embodiment of the creation of a heterogeneous data source, such as data source 14 shown in FIG. 1.

In one embodiment data source 14 is a heterogeneous data source that includes data from a plurality of different sources and/or channels of varying quality. FIG. 2 is a simplified block diagram showing various data sources 14a and data channels 14b that can be used to compile data source 14 according to one embodiment of the invention. Examples of data sources 14a include local customer databases from different offices or departments of the organization that hosts system 10; subscription databases; order management, contract and service databases; and customer lists from external vendors. Examples of data channels 14b include web site visits, data from direct marketing campaigns and data from event registration and attendance. In one embodiment information from data channels 14b is stored in a data source 14c, such as a database file, and received over the Internet or entered via a personal computer or other data entry device 15. A person of skill in the art will appreciate that data source 14 can be formed by merging the records from data sources 14a and 14c into a single source and, in other embodiments, can be maintained on an ongoing basis as a single source by continuously updating records in data source 14 from various channels 14b and thereby alleviating the necessity of some or all of the intermediate data sources 14a and/or 14c.

Referring back to FIG. 1, system 10 includes two primary components: a user interface 20 and a rules engine 22. User interface 20 allows users 12 to define a data format 30, create a rule set 32 and is intended to operate on and assess a quality of data formatted according to the data format and identify the source of data, i.e., data source 14, upon which the rules in rule set 32 can be executed on. Data format 30 describes the schema of data to be analyzed. A data format includes a sequence of named attributes. For example, a particular schema may include a first and last name and an email address of a customer. Once the attributes of the schema are defined, data of that schema (or data of the defined data format) can be retrieved from the data source.

Rule set 32 is a set of rules that can be applied to the attributes in the data and is intended to operate on and assess a quality of data formatted according to the data format. Rule set 32 is devised by a user to measure or assess the quality of data within the data source. The data within data source 14 has many different dimensions. Rules in rule set 32 can be devised to assess the believability of the data, the completeness of the data, whether or not the data is free from errors, the timeliness of the data and a value-added factor of the data. Table 1 below identifies various data dimensions and includes a brief discussion on how rules can be crafted to address each dimension.

TABLE 1

Data Dimensions Measurable By Rules

| Dimension | Discussion |
| --- | --- |
| Believability | Rules can check consistency of data attributes which can be used to encode believability. |
| Completeness | Rules can check the existence of data. |
| Free-of-Error | Rules can check consistency of certain types of data. |
| Timeliness | Rules can check access and update history. |
| Value-Added | The forecasted quality score can represent the potential benefit from the data. |

In one embodiment of the invention there are five different categories of rules that can be defined by a user 12 to be included in any given rule set 32. The five categories include: spatial rules, age/lineage rules, pattern-based rules, electronic validation rules and numeric operator-based rules. Spatial rules operate on data that can be geocoded using a spatial database or on data that can analyzed against geocoded data. For example, a physical address can be verified using a spatial database. Also, a phone number that is associated with the address (e.g., in the same data record) can be calculated to match the address if the geocode of the address is within a specified distance from the geocode of the phone number. In one embodiment, Oracle9i Spatial and Oracle 9i Application Server Wireless Edition products are used to retrieve the geocode of addresses and phone numbers if required by a particular spatial rule.

Age/lineage rules include rules that assess the update history of contact data, rules that track activities such as event attendance, website visits, etc. and rules that assess the source of the data. Patterns-based rules are rules that rely upon text patterns to assess the validity of data. For example, rules that look for 10-digit phone numbers, rules that look for an "@" symbol in an email address, and rules that look for vowels in a first or last name, etc.

Electronic validation rules are rules that actively verify critical pieces of information, such as email addresses, domain names, phone numbers, etc. Various testing strategies can be used for electronic validation including intrusive tests, such as sending confirmation emails to an email address and passive tests, such as using an SMTP verify command, using DNS to ensure a domain name is registered and using exchanges to verify phone numbers that are published and not mobile. Phone numbers can be verified by, for example, checking if the number is published in a phone book or phone billing database or by checking if the area code and exchange exist in combination. Finally, numeric operation-based rules are rules that add filter conditions such as mathematical operators.

In one embodiment, each rule in rule set 32 has a score associated with it. Data that meets the conditions of the rule are then assigned the score. Some rules have a positive score associated with them (e.g., if an email address is verified using SMTP verify, 20 can be added to the score of the data record) while other rules have a negative score associated with them (e.g., if a zip code includes alphabetic characters, 30 can be subtracted from the score of the data record).

A user 12 devises rules and assigns scores to each rule based on the user's historical understanding of the differences between good and bad data. In some embodiments, system 10 includes a rule update engine (not shown in FIG. 1) that relies upon feedback from users of the system as to which leads represented good data and which leads represented bad data. The update engine applies artificial intelligence techniques to then adjust the scoring weight of one or more individual rules in the rule set. In this manner, system 10 can be continuously trained to produce ever improving results.

Rules within rule set 32 can also be categorized as generic rules 34 that are operable on any type of data and data-specific rules 36 that make sense for only particular types of data. As examples, in one embodiment generic rules may include:
EXIST (existence of an attribute),
INCLUSION (inclusion of an attribute in a set of values),
EQUAL (an attribute's value equals a particular value), and
FORMAT (an attribute's value has a particular format);
while data-specific rules may include:
GEOCODE (applied to an address, checks whether the address can be successfully geocoded), and
EMAIL_FORMAT (applied to an email address, checks to see if email address is valid).

Figure 3:
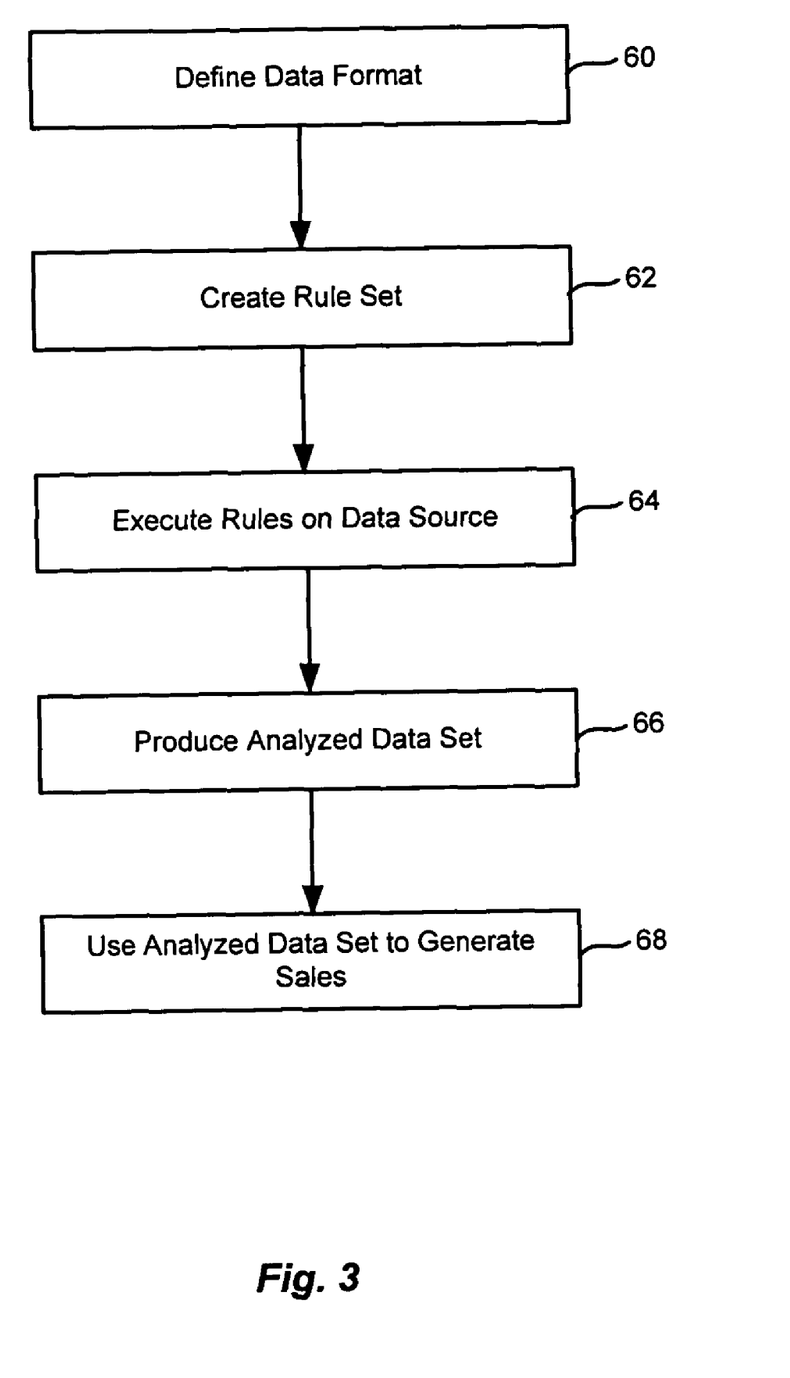
FIG. 3 is a flowchart depicting steps associated with sorting and/or filtering contact information according to one embodiment of the invention.

FIG. 3 is a flowchart depicting steps associated with sorting and/or filtering contact information according to one embodiment of the invention. In one embodiment, user interface 20 of system 10 generates appropriate html pages to guide users through the various steps outlined in FIG. 3. As shown in FIG. 3, in operation a user first defines a data format 30 (step 60) and creates a rule set 32 (step 62). The step of defining the data format (step 60) includes selecting appropriate attributes as discussed above, selecting an appropriate data source 14 and mapping individual data elements in the data source (e.g., fields in a database or columns in a spreadsheet) to the attributes. In one embodiment the data format is assigned a name so that it can be easily associated with a rule set as described below and the step of defining a data format can include copying and then editing a previously defined data format or creating a new data format from scratch. In one embodiment the step of selecting an appropriate data source includes first telling system 10 whether the data source will be a spreadsheet file (e.g., an Excel file) or a database file, then entering the location of the desired data source and then lastly mapping data elements in the data source to the defined attributes.

Similarly, in one embodiment creating a rule set 32 can start by copying and editing an existing rule set or by creating a new rule set from scratch. Each rule set is typically given a name and associated with a particular data format. A rule set may include many different rules. FIG. 4 shows an example of an exemplary web page 70 that can be generated by user interface 20 to assist users 12 in creating rules for a given rule set. As shown in FIG. 4, a rule set can be represented as a table with each row 71 of the table representing a specific rule in the rule set. Each rule identifies an attribute 72 the rule operates on, an expression 73, up to two arguments 74, 75 (expression values) for the expression and a score 76. The expression defines what type of test will be applied to the data record and the attribute defines which attribute of the data record will be scored by the rule. The meaning of the expression values depends on the expression and the score defines what value is added or subtracted to the data quality assessment of each record based on whether or not the attribute of the record meets the condition of the expression.

In example web page 70 shown in FIG. 4, a rule set has been defined that includes three separate rules that each operate on different attributes: first_name, email_address and last_name. In some embodiments, a user can select an attribute each rule operates on via a drop down menu and then select an expression to apply to the attribute via a second drop down menu. In such an embodiment, the second drop down menu will include expressions that can be generically applied to any attribute as well as expressions that are only relevant to the specific attribute selected.

When ready, a user 12 can instruct system 10 through user interface 20 to assess the quality of the data in a data source 14 (FIG. 3, step 64). In one embodiment this can be done, for example, by selecting a "run analysis" icon on an appropriate web page generated by user interface 20. Such a selection causes rules engine 22 to execute the set of rules 32 on data source 14, both of which were defined and identified by the user.

The rules engine reads pieces of data from the data source either in batches or a single row at time where a "row" of data includes some number of named attributes and executes each rule in the rule set (or each active rule in the rule set in embodiments where individual rules can be turned OFF and ON by, for example, selecting an "active" box 77 as shown in FIG. 4) to produce a set of analyzed data. The logic implemented in rules engine 22 can be represented in the following psuedocode where, each data element is applied to the rule, and upon passing the rule, the score of the datum is increased by the weight of the rule:

```
for i <- 0 to data
    do datum <- data[i]
        for j <- 0 to rules
            do rule <- rules[j]
                if rule.apply(datum) = true
                    then datum.score <- datum.score + rule.weight
                    else datum.score <- datum.score + 0
                j <-- j+1
    i <-- i+1
```

User interface 20 allows users 12 to view, rank and sort the analyzed data 40 in a variety of manners. For example, a user can rank the data by score and thus view the data as scored data 42 (shown in FIG. 1) or similarly, a user can view only the data records that pass a minimum cut-off score. Alternatively, a user can sort the data into different buckets thereby creating bucketed data 44 where each data record placed in a specific bucket passed or failed (depending on the bucket rule) every rule associated with the bucket.

FIG. 5 shows an example of a web page 80 that can be generated by user interface 20 to assist users 12 in creating filters that sort the data into a bucket. As shown in FIG. 5, after rule engine 22 executes a given rule set on a given data source, the results of rule on the data set can be displayed to a user 12 as the number of data records that passed the rule (column 81) as well as the percent of data records that passed the rule (column 82). A user can use web page 80 to select which rules will be used to filter data into a bucket via selection column 83. More than one rule can be selected by clicking on multiple boxes in column 83. One the user is satisfied with a particular filter (i.e., the user has selected the rules he/she wants to use to create a bucket), the user can select the download results icon 84 to generate a list of the data that passed the filter and was sorted into the bucket.

As an example, suppose a particular user desires can create a bucket for "large companies". To do so, the user may define two rules—one based on revenue and one based on number of employees. If both rules pass, the data would be put into the "large company leads" bucket. A person of skill in the art will realize that some embodiments of the invention will allow buckets to be created using AND or OR logic. For example, in the above example data could be put into the "large company leads" bucket if either rule passed. The skilled artisan will also realize that some embodiments of the invention will allow buckets to be created immediately upon executing the rules instead of, or in addition to, scoring the data in the first place.

In one embodiment, user interface 20 of system 10 generates appropriate html pages to guide users through the various steps outlined in FIG. 3.

Further Details of One Exemplary Embodiment

In order to further explain the present invention, implementation details of one particular embodiment are set forth below. A person of skill in the art will readily appreciate that the following embodiment is for exemplary purposes only and that the invention is in no way limited to this particular implementation. In the exemplary embodiment, rules engine 22 is part of a java layer that interfaces user interface 20 to the data source 14. System 10 stores the data format, individual rule definitions and rule sets as XML files with the data format and rule sets stored at an underlying database level (same level as data source 14) and the rule definitions stored at the java layer. Each rule definition contains the name, class name, named attributes and properties for that rule where the rule definition class contains a static list of all the rule types available for the system.

Rule definitions are stored in a rule definition file. The rule definition file thus includes many different rule definitions, each defining a rule that is available in the system. An example of an XML rule definition file is listed below:

```
<rulesdefinition ...>
    <ruledef name="LengthRule" implementation="..." description=
    "Length is at least X characters">
        <property name="length" type="singleton" required="true"/>
    </ruledef>
    <ruledef name="AddressRule" implementation="..." description=
    "Address can be geocoded">
        <named-attribute name="address"/>
        <named-attribute name="zipcode"/>
        <named-attribute name="city"/>
        <named-attribute name="state"/>
    </ruledef>
</rulesdefinition>
```

The above exemplary rule definition file includes two rule types: one that tests the length of an attribute greater than or equal to a constant and one that geocodes an address. The property in the length rule defines a singleton property called length that users of the rule must specify by, for example, entering an appropriate expression value in column 74 of web page 70. The address rule has a list of named attributes, which are attributes that the rule looks up by name. Thus, when the rule is used, the data format must include either an attribute with that name or a mapping from an attribute to that name.

Figure 6:
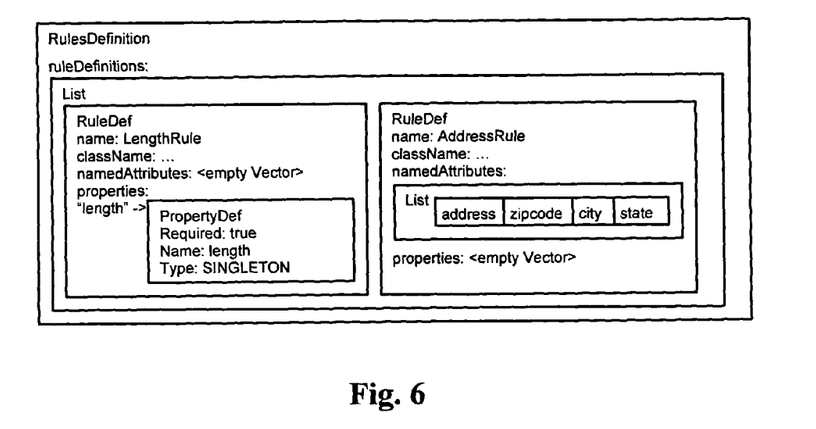
FIGS. 6-9 show simplified object structures used by one embodiment of system 10 to define rules, a data format, a rule set and data buckets, respectively.

FIG. 6 is a diagram illustrating the object structure in memory for the above rule definition file. Each box shown in FIG. 6 represents an object with it's class name in the upper left corner.

Each data format definition, which is stored as an XML file in the database layer, has a name, data store and description associated with it. An example of an XML data definition file is listed below:

```
<data name="Lead Data" datastore="..." description="CSV file leads
data">
    <attributes>
        <attribute name="CUSTOMER_NAME"/>
        <attribute name="ADDRESS1"/>
        ....
```

-continued

```
    </attributes>
    <maps>
        <mapto internalname="ADDRESS" externalname=
        "ADDRESS1"/>
    </maps>
</data>
```

The datastore attribute contains the name of the class to be used to load the data. The data definition also contains a list of named attributes and a list of mappings from internal names of attributes to the names of attributes in the data definition. These internal names are used by the rules to refer to attributes by name. The mapping allows different rules to refer to the same attribute by different names. To use such rules, the user maps the name of the attribute to in their data format to each of the names required by the rules.

Figure 7:
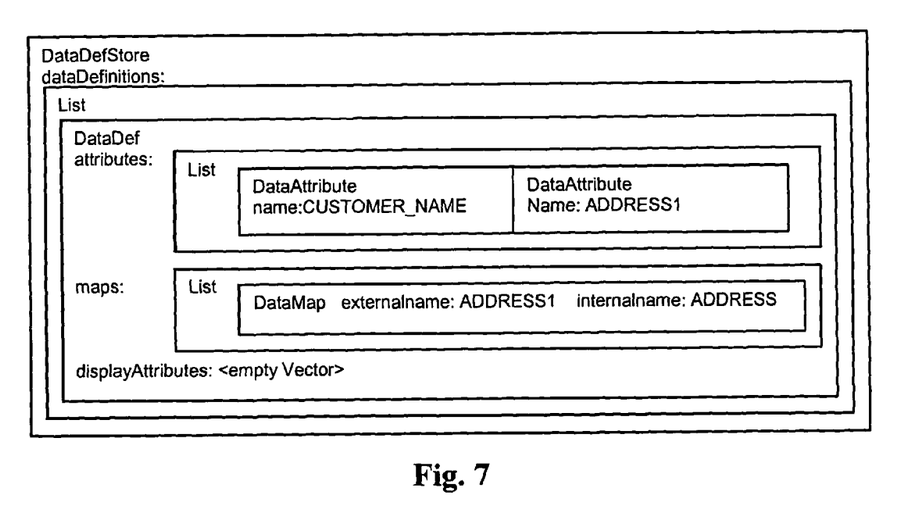
Figure 8:
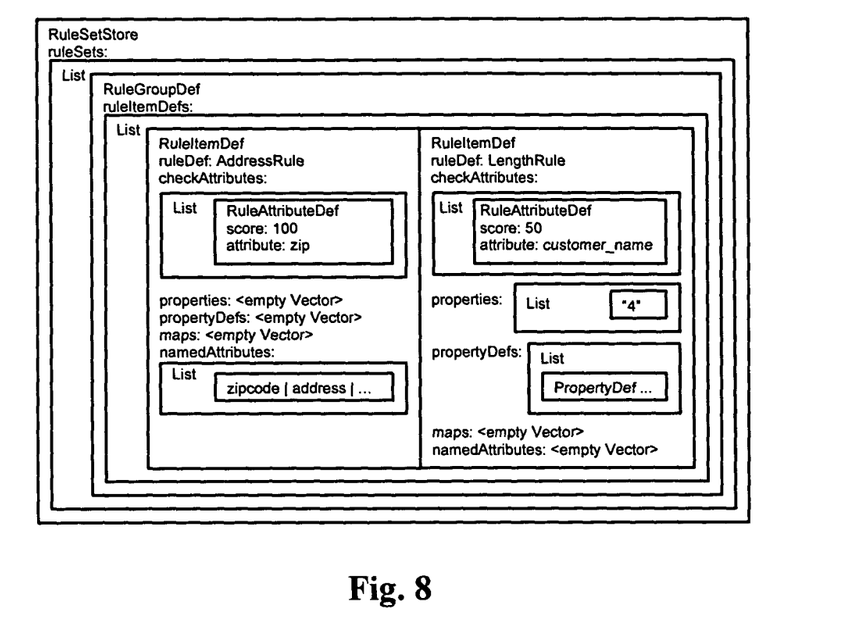

The above data format definition file is represented in memory with the object structure shown in FIG. 7. As shown in FIG. 7, the DataDefStore contains a list of the available data definitions that have been created in the system. Each data definition is represented by a DataDef which contains the attributes and mappings for the data definition.

After defining a data format, a user can define a rule set to be executed on data meeting the format. The following is an example of an XML rule set file:

```
<rulesengine name="..." datadef="...">
    <rulegroup name="SINGLE_RULE_GROUP">
        <rule name="rule 1" ruledef="AddressRule">
            <checkattribute score="100" attribute="zip"/>
        </rule>
        <rule name="rule 2" ruledef="LengthRule" length="4">
            <checkattribute score="50" attribute="customer_name"/>
        </rule>
    </rulegroup>
</rulesengine>
```

In this embodiment a rule set may actually include several rule groups with each rule group being a named group of rules. This use of rule groups simplifies copying sets of related rules from one rule set into another. As shown above, each rule has a name, a rule type, properties that are specific to the rule type and some number of attributes the rule is to check. A checkattribute specifies that the rule should be applied to that attribute, and if it is passed, it should increment the attributes score by the score amount. For instance, the second rule specifies that if the length of customer_name is at least 4 characters, the customer_name attribute's score should be increased by 50.

The RuleSetStore keeps track of the rule sets that are loaded into the system. It contains a list of RuleGroupDefs, each containing multiple RuleItemDefs, which represent the rule elements in the XML file. A RuleItemDef contains a name, the attributes it is to check and the values of its properties. It also contains a list of PropertyDefs and anmed attributes for the corresponding RuleDef and the mappings for the corresponding DataDef.

Table 2 below lists examples of some of the java based rules that are available according to one embodiment of the invention. A person of skill in the art will readily appreciate that the rules can be created in languages other than java and that the following list of rules is for exemplary purposes and that many other different rules can be generated and included in rule set 32.

TABLE 2

Example List of Rules According to One Embodiment of Invention

| Dimension | Discussion |
| --- | --- |
| AddressRule.java | Checks if the address can be geocoded |
| AlphabeticRule.java | Checks that a string contains only alphabetic characters |
| And.java | Checks if two rules both pass |
| BasicEmail.java | Checks if the email is well-formed, and that its domain is not in the excluded list |
| Between.java | Checks if a numeric attribute fails between two values. |
| CheckEmailRule.java | Attempts to SMTP VERIFY an email address |
| EmailDomainName.java | Checks if the domain name of an email address exists (nslookup) |
| ExclusionSetRule.java | Checks that a attribute value is NOT in a specified set of values |
| Existance.java | Checks that an attribute value is not null and not "" |
| InclusionSetRule.java | Checks that an attribute is in a specified set of values |
| LengthRule.java | Checks that an attribute's string length is gte a specified value. |
| NameAlphabeticRule.java | Checks alphabetic rule and existence on FIRST_NAME and LAST_NAME |
| NameLengthRule.java | Checks the length of FIRST_NAME plus LAST_NAME is gte a specified value. |
| Operator.java | Checks the relationship with a specified value (compareTo), based on operator (gt, eq, neq, gte, lt, lte) |
| OperatorEQ.java | Checks the attribute value is equal to a specified value |
| OperatorGT.java | Checks the attribute value is greater than a specified value |
| OperatorGTE.java | Checks the attribute value is greater than or equal to a specified value |
| OperatorLT.java | Checks the attribute value is less than a specified value |
| OperatorLTE.java | Checks the attribute value is less than or equal to a specified value |
| OperatorNEQ.java | Checks the attribute value is not equal to a specified value |
| PhoneApproximateRule.java | Checks that the geocode of a phone number is within a specified number of miles of the geocode of an address |
| REDataFormat.java | Checks that the value matches a specified regular expression |
| REDataFormatReverse.java | Checks that the value does not match a specified regular expression |
| RecentDate.java | Checks that the date is within a specified number of days in the past, given a specified date format |
| ValidTelephone.java | Validates a telephone number with Targus. |
| VowelRule.java | Checks that the attribute value contains a vowel |
| WordRule.java | Applies several heuristics to determine if a string is a word, such as no 3-letters in a row, a vowel or non-leading Y in the string, etc. |
| ZipCodeCity.java | Checks that city, state, zip match each other |
| ZipCodeState.java | Checks that state and zip match each other |

Once all the XML definition files have been created and parsed, a data set can be provided and the rules are executed on the data by rules engine 22. During execution, rules engine 22 coordinates reading data and setting up the rules for execution. To accomplish this, rule objects are created to meet the definitions in the RuleSet; DataStore and Data objects are created based on the data provided and the DataDef; and Buckets and a BucketStore are created based on the BucketDefs and BucketStoreDefs as described below.

Figure 9:
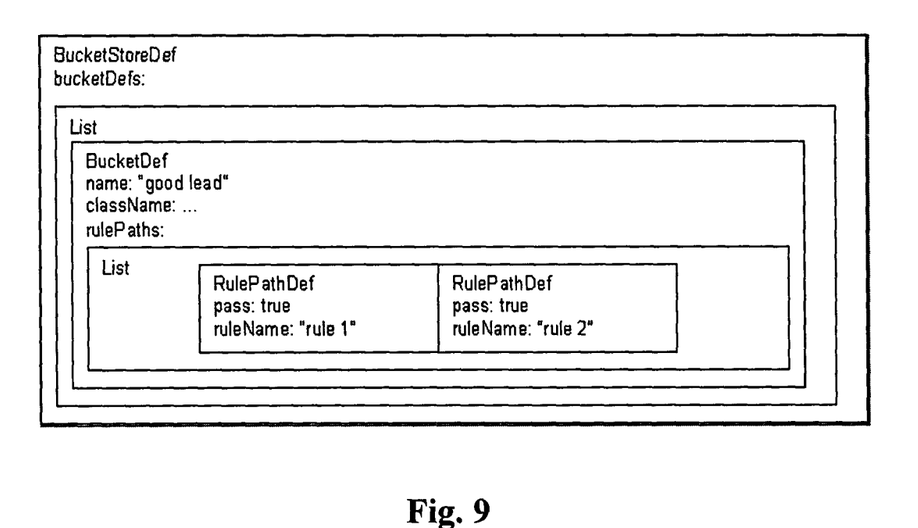

The bucket definition XML file defines how to filter the data into buckets based on what rules are passed. FIG. 9 shows the structure in memory of objects representing the bucket definition file. As shown in FIG. 9, the BucketStoreDef contains a list of buckets, which each include a name and a list of RulePathDefs. A RulePathDef represents a checkpoint—a rule and whether the rule must pass or fail. A checkpoint passes if the corresponding rule meets the pass/fail criteria. A bucket passes if each of its checkpoints pass. When a bucket passes, the piece of data is included in that bucket. An example bucket definition XML file is shown below:

```
<buckets bucketstore="...">
    <bucket name="GOOD LEAD">
        <path>
            <checkpoint pass="yes" rulename="rule 1"/>
            <checkpoint pass="yes" rulename="rule 2"/>
        </path>
    </bucket>
</buckets>
```

For each Rule and Data created, the rule executes on the data, and updates the score of the data record's attributes as needed. After all rules are executed on all data records, the data is assigned to buckets by the bucket store. Additional statistics are also collected by classes in the statistics package.

The scores, buckets, and statistics are then displayed to the user as the output of the execution.

Having fully described several embodiments of the present invention, other equivalent or alternative methods of practicing the present invention will be apparent to those skilled in the art. For example, while system 10 was described as a distributed system, the system may be deployed in various other environments such as an enterprise environment, a stand-alone system, and the like. Also, while the present invention has been described using a particular combination of hardware and software, it should be recognized that other combinations of hardware and software are also within the scope of the invention. Specifically, the invention may be implemented primarily in hardware, primarily in software, or using appropriate combinations thereof.

As another example, while step 60 for defining a data format and step 62 for creating a rule set are shown in FIG. 3 as occurring in a particular order sequentially, a person of skill in the art will readily appreciate that the steps can occur in the opposite order or can be carried out essentially in parallel by one or multiple users. These and other embodiments as well as alternatives and equivalents to the invention will be recognizable to those of skill in the art after reading the description of the present invention. The scope of the invention should not, therefore, be determined solely by reference to the above description, but instead should be determined with reference to the appended claims along with their full scope of equivalents and alternatives.

What is claimed is:

1. A computer-implemented method of evaluating sales leads stored in a data source, the method comprising:
    forwarding, from a source computer system, information that configures one or more destination computer systems to display a graphical user interface allowing one or more users of the one or more destination computer systems to define data formats indicative of potential sales leads in the sales leads stored in the data source;
    receiving, at the source computer systems, information provided by a user of a destination computer system via the graphical user interface specifying a data format indicative of a first group of potential sales leads in the sales leads stored in the data source, the data format defining a plurality of attributes including at least a first name attribute, a last name attribute, and an email address attribute, each attribute formatting data associated with the sales leads stored in the data source according to the data format for the first group of potential sales leads;
    forwarding, from the source computer system, information that configures the one or more destination computer systems to display the graphical user interface allowing the one or more users of the one or more destination computer systems to define rules that operate on attributes of data formats indicative of potential sales leads in the sales leads stored in the data source to assess an individual quality of each potential sales lead;
    receiving, at the source computer system, a plurality of rules provided by the user of the destination computer system via the graphical user interface that operate on the plurality of attributes of the data format to assess an individual quality of each individual potential sales lead in the first group of sales leads, wherein each rule in the plurality of rules defines:
        information indicative of at least one attribute in the plurality of attributes of the data format,
        information indicative of an expression to be applied to data associated with the sales leads stored in the data source corresponding to the at least one attribute, and
        a value to be added or subtracted to a score representing the individual quality of each potential sales lead based on an evaluation of the data associated with the sales leads stored in the data source corresponding to the at least one attribute with the expression;
    receiving, at a computer system, information mapping data identifying a plurality of sales leads from the selected data source to the plurality of attributes of the data format;
    executing, with the computer system, the plurality of rules on the mapped data to produce a set of analyzed data, the set of analyzed data including the score for each potential sales lead indicating the individual quality of each potential sales lead in the first group of potential sales leads, and
    depending upon an outcome of the execution of the plurality of rules, generating with the computer system information sorting the analyzed data into at least a first bucket in which the mapped data passed a selected one or more of the executed plurality of rules and a second bucket in which the mapped data failed to pass the selected one or more of the executed plurality of rules.

2. The method of claim 1 wherein the data source is a heterogeneous data source.

3. The method of claim 1 wherein the plurality of rules that can be defined by a user include spatial rules, age/lineage rules, pattern-based rules, electronic validation rules and numeric operator-based rules.

4. The method of claim 1 further comprising, after executing the plurality of rules, ranking data from the set of analyzed data according to its score.

5. A computer-implemented method of evaluating sales leads stored in a data source, the method comprising:
    forwarding, from a source computer system, information that configures a destination computer to display a graphical user interface allowing a user of the destination computer to define data formats indicative of potential sales leads in the sales leads stored in the data source;
    receiving, at the source computer systems, information provided by the user of the destination computer system via the graphical user interface specifying a data format indicative of a first group of potential sales leads in the sales leads stored in the data source, the data format defining a plurality of attributes including at least a first name attribute, a last name attribute, and an email address attribute, each attribute formatting data associated with the sales leads stored in the data source according to the data format for the first group of potential sales leads;
    forwarding, from the source computer system, information that configures the destination computer system to display the graphical user interface allowing the user of the destination computer system to define rules that operate on attributes of data formats indicative of potential sales leads in the sales leads storing in the data source to assess an individual quality of each potential sales lead;
    receiving, at the source computer system, a plurality of rules provided by the user of the destination computer system via the graphical user interface that operate on the plurality of attributes of the data format to assess an individual quality of each individual potential sales lead in the first group of sales leads, wherein each rule in the plurality of rules defines:

information indicative of at least one attribute in the plurality of attributes of the data format,
information indicative of an expression to be applied to data associated with the sales leads stored in the data source corresponding to the at least one attribute, and
a value to be added or subtracted to a score representing the individual quality of each potential sales lead based on an evaluation of the data associated with the sales leads stored in the data source corresponding to the at least one attribute with the expression; and wherein the plurality of rules include spatial rules, pattern-based rules and electronic validation rules;
mapping, with a computer system, data identifying a plurality of sales leads from the selected data source to the plurality of attributes of the data format;
executing, with a computer system, the plurality of rules on the mapped data to produce a set of analyzed data usable to assess the individual quality of each potential sales leads in the first group of sales leads, the set of analyzed data including the score for each potential sales lead indicating the individual quality of the potential sales lead; and
depending upon an outcome of the execution of the plurality of rules, generating information with the computer system sorting the analyzed data into at least a first bucket in which the mapped data passed each of the executed plurality of rules and a second bucket in which the mapped data failed to pass each of the executed plurality of rules.

6. The method of claim 5 further comprising, after executing the plurality of rules, allowing a user to rank data from the set of analyzed data according to its score.

7. The method of claim 5 wherein the plurality of rules include age/lineage rules and numeric operator-based rules.

8. A system for evaluating contacts stored in data sources, the system comprising:
a network;
a set of one or more computers coupled to the network;
a data source accessible to the set of computers over the network, the data source being one of a database and a spreadsheet file;
a first computer-readable medium configured to store a user interface component executed by a computer and configured to allow one or more users of the computer to:
define data formats indicative of potential sales leads in the contacts stored in the data sources, a data format indicative of a first group of potential sales leads in the contacts stored in the data sources including a plurality of attributes including at least a first name attribute, a last name attribute, and an email address attribute, each attribute formatting data associated with the contacts stored in the data sources according to the data format for the first group of potential sales leads;
define rules that operate on attributes of data formats indicative of potential sales leads in the contacts stored in the data sources to assess an individual quality each potential sales lead; wherein each rule in a plurality of rules associated with the data format for the first group of sales leads defines:
information indicative of at least one attribute in the plurality of attributes of the data format,
information indicative of an expression to be applied to data associated with the sales leads stored in the data source corresponding to the at least one attribute, and
a value to be added or subtracted to a score representing the individual quality of each potential sales lead based on an evaluation of the data associated with the sales leads stored in the data source corresponding to the at least one attribute with the expression; and
map data identifying a plurality of contacts from the data source to the data format; and
a second computer-readable medium configured to store a rules engine component executed by one or more computers in the set of computers and configured to execute the plurality of rules on the mapped data to produce a set of analyzed data usable to assess the individual quality of each potential sales lead in the first group of potential sales leads, the set of analyzed data including the score for each potential sales lead indicating the individual quality of the potential sales lead, the rules engine being further configured to sort the analyzed data into at least a first bucket in which the mapped data passed each of the executed plurality of rules and a second bucket in which the mapped data failed to pass each of the executed plurality of rules.

9. The system of claim 8 wherein the user interface is further configured to allow a user to rank data from the set of analyzed data according to its score after the rules engine executes the plurality of rules.

\* \* \* \* \*

UNITED STATES PATENT AND TRADEMARK OFFICE
CERTIFICATE OF CORRECTION

| | | |
|---|---|---|
| PATENT NO. | : 7,865,507 B2 | Page 1 of 1 |
| APPLICATION NO. | : 10/663296 | |
| DATED | : January 4, 2011 | |
| INVENTOR(S) | : Aman Naimat et al. | |

It is certified that error appears in the above-identified patent and that said Letters Patent is hereby corrected as shown below:

On the cover page, item (75), in column 1, in "Inventors", line 1, delete "Aman Namait" and insert -- Aman Naimat --, therefor.

On the cover page, item (75), in column 1, in "Inventors", line 3, delete "Foster," and insert -- Foster City, --, therefor.

In column 6, line 18, delete "psuedocode" and insert -- pseudocode --, therefor.

Signed and Sealed this

Fourth Day of October, 2011

David J. Kappos
*Director of the United States Patent and Trademark Office*